United States Patent Office 3,573,937
Patented Apr. 6, 1971

3,573,937
PROCESS FOR PRODUCING BANANA AND PLANTAIN PRODUCT FRIED CHIPS
Edward J. Sarna, Yonkers, N.Y., assignor to Robert C. Berg, Jr., Bronx, N.Y., and Barstow Bates, Old Greenwich, Conn., fractional part interest to each
No Drawing. Filed Jan. 26, 1968, Ser. No. 700,709
Int. Cl. A23b 7/00, 3/00; A23l 1/100
U.S. Cl. 99—204                                                              7 Claims

ABSTRACT OF THE DISCLOSURE

Fried chip products are prepared from thin heat-treated sections of mature, unripened banana and plantain pulp which have been dehydrated.

---

This invention has to do with products formed from thin sections of the pulp of mature, unripened bananas and plantains.

Bananas and plantains are available in abundance in tropical and semi-tropical areas of the world. Thus, they constitute a considerable available food source. Many efforts have been made in past years to develop products from bananas and plantains (genus-Eumusa). Banana flour, powder and chips are among such products as indicated in the text: Bananas by H. W. Von Loesecke, 1950, Interscience Publishers, Inc., New York. Chips, however, have been unsatisfactory in that they have retained high concentrations of fat in which they have been prepared resulting in limited appeal in some countries. Further, the resultant products tend to become rancid because of their high fat content. And they have been relatively expensive products.

This invention is concerned with a process for making banana and plantain products from the mature, unripened fruit. Such products can be prepared completely near their growth source, or intermediate products can be so prepared and then properly packaged and shipped elsewhere for conversion to final products.

In accordance with the present invention, there are provided banana and plantain pulp products having a water content from about 5 to about 15 percent by weight. There are also provided crisp, friable products obtained by frying the first-mentioned products, the fried products having a fat content of less than about 30 percent by weight, and preferably from 10–25 percent by weight.

In accordance with the present invention, there is also provided a process for producing a banana or plantain product, which comprises:

(a) heating a section of banana or plantain pulp having a total sugar content up to about 1 percent by weight and having a thickness from about 0.02 inch to about 0.1 inch, to a temperature from about 150° F. to about 250° F. for a time interval from about 1 to about 45 minutes;
(b) cooling said section to a temperature from about 35° F. to about 200° F.; and
(c) drying said section to a water content from about 5 to about 15 percent, by weight.

The dried section of (c) can then be fried.

The dried section of (c) can also be reconstituted with water or other edible liquids such as sauces or gravies to serve as a starch-type food. Thus, the dried section can be so used to impart flavor or characterizing texture to numerous foods prepared in a casserole fashion; the dried section is used in place of or in combination with potatoes, rice or other vegetables, fruits or grains. It is contemplated, therefore that the dried section of (c) can be baked, roasted, broiled or otherwise cooked.

In preparing the products of this invention, the pulp of unripened, mature bananas and plantains is used. The unripened, mature pulp should have a total sugar content of less than about 1, and preferably less than about 0.7, percent by weight. Thus, the pulp should have a substantial starch content and little sugar content. Excessive sugar in the pulp is detrimental in that fried chips formed from such a pulp are highly discolored, dark and not as crisp as the desired products. It is advantageous that the fruit be picked when it has attained maximum size but before any appreciable degree of ripening or development of total sugars has occurred.

Since it is difficult to separate the peel and the pulp of the unripened, mature fruit, without fracturing the pulp, the fruit is heated sufficiently to loosen the peel from the pulp. This is accomplished by heating the fruit with an atmosphere of steam or by immersing the fruit in boiling water. Temperatures for this treatment range from about 150° F. to about 250° F. Depending upon the size of the fruit, type of fruit and temperature, the fruit is so heated for from about 1 to 15 minutes, and preferably 5–10 minutes at 200–212° F. With such a treatment, the peel is loosened from the pulp and the peel bursts. The peel can be stripped or otherwise separated from the pulp by hand or by mechanical means.

As an aid in the separation of the peel and pulp, and for the slicing of the pulp, it is advantageous to cool the fruit before the peel and pulp are separated one from the other. This is readily accomplished by spraying the fruit with water, or immersing it in water, to reduce the temperature to an approximate range of 35–200° F., preferably 100–150° F. Generally, the fruit is cooled at least about 50° F.

The pulp is then sliced into thin sections having a thickness from about 0.02 to about 0.1, and preferably 0.03–0.06 inch. The pulp can be sliced transversely against the vertical grain or at a variety of angles with respect to the vertical grain in order to obtain slices of larger size. Mechanical means are employed for slicing the pulp into substantially uniform slices. For example, the pulp can be positioned on a platform which can be moved at a prescribed speed, and slicing means as a knife or plurality of knives can be brought to bear upon the pulp as the platform advances. It will be obvious that the pulp can also be sectioned or sliced by manual means.

At this stage of the process, it is advantageous to treat the sectioned pulp with an antibrowning agent such as sulfur dioxide, sodium bisulfite (a source of $SO_2$), or citric acid. The agent is an aid to inhibiting or preventing discoloration of the products obtained from the pulp. Temperature of this treatment can range from about 35° F. to about 200° F. The quantity of antibrowning agent is from 0.5 to 2 percent by weight of the sectioned pulp.

The sectioned pulp is next heated (cooked) to a temperature from about 150° F. to about 250° F. for a time interval of from about 1 to about 45 and preferably 15–30 minutes, with the lower temperatures being employed for longer time intervals and the higher temperatures being employed for shorter time intervals. The sectioned pulp can be so heated, but is more advantageously heated in water or in live steam. Thus, at the higher temperatures indicated, cooking can be conducted in an autoclave. The heat treatment serves to inactivate natural enzymes present in the pulp, which enzymes appear to cause excessive browning of the pulp. In addition, the heat serves to fix the cell structure of the pulp sections, and partially gelatinizes the raw starch therein.

The cooked, sectioned pulp is promptly cooled to a temperature of from about 35° F. to about 200° F. to firm the slices or sections and to reduce breakage in the further handling thereof. That is, the cooked, sectioned pulp is preferably cooled at least about 50° F. below the temperature at which it is cooked. Cooling can be accomplished by flowing cold air, nitrogen or other inert gas over the slices, or by washing the slices with cold water. The water wash is advantageous in removing any excess free starch thereon.

If desired, additional firmness of the slices can be gained by contacting the slices while hot or when cooled with a water-soluble calcium salt including the chloride, sulfate and gluconate.

The cooled pulp sections are then dried to a water content ranging from about 5 to about 15, and preferably 8–12, percent by weight. Higher water contents are to be avoided because mold may form on the product in storage, and because undesirable discoloration and/or flavor degradation may occur. Lower water contents are disadvantageous because insufficient water in the product is available to puff the product when it is fried. Drying can be accomplished with conventional tunnel, tray-belt, or still air drying techniques. Temperatures and air flow can be regulated to provide suitable drying rates. For example, temperatures can range from 50–300° F. and air rates can range up to several thousand cubic feet per minute.

The resulting, partially dried pulp section, has the appearance of a horny chip which is hard, translucent and can be fractured. In these respects, the product is analogous to an uncooked pasta product such as a macaroni. This is an intermediate or first-stage product having a relatively long shelf life as a result of its low moisture content and method of preparation. This chip can be processed further to a final or second-stage product, or can be packaged for shipment to another destination for processing to a final product. If packaged, the chip should be maintained at the desired moisture content. Thus, the container in which the chip is confined should have an effective moisture barrier, for example a polyvinylidene chloride (Saran) or polyethylene liner or coating. The packaging material should also have strength in order to avoid breakage in shipment. Thus, the container is confined in an outer, rigid container such as a carton or drum. It will be apparent, therefore, that the first-stage chip can be prepared at or close to the source of the fruit and can then be converted to a second-stage chip or final product at another and distant location.

The first-stage chip is converted to a final product by frying in a suitable cooking oil for a short period of time. Expansion or puffing and frying of the first-stage chip occurs with the oil heated to a temperature of from about 275° F. to about 400° F. for 5 to 60 seconds, and preferably 360–380° F. for 10–25 seconds. The first-stage chip expands to approximately the size and volume of the slice or section from which it is prepared, in the initial 5–10 seconds of the frying cycle. The balance of the frying cycle serves to develop desired color and flavor of the final product. In view of the relatively short frying operation, only a relatively small quantity of oil or fat is absorbed in and on the chip. It is advantageous to drain any excess fat from the fried product. Generally, the fat content will be less than about 30, and preferably 10–25, percent by weight of the fried chip. Because of the low fat content, the final or second stage chip has a substantial shelf life, is relatively free of a greasy surface, and is easily packaged. It will be obvious, too, that lower fat content means lower expense for cooking oil and relatively lower caloric content.

The final product distinguishes from the first-stage product in that it is crisp and friable.

A variety of cooking oils can be used for the frying operation including cottonseed oil, peanut oil, corn oil, soybean oil, cocout oil, palm oil, safflower oil, lard, butter unstabilized and stabilized hydrogenated animal fats, and other indigenous oils such as ghee, and mixtures thereof.

The fried chips can be seasoned with a variety of seasoning agents and flavoring agents including salt, barbecue sauces, cheese, spice meat sugar, artificial flavors or sweeteners (e.g., Sucaryl) and fruit flavors. Alternatively, seasonings or flavors can be added at different stages of the process, as with an antibrowning agent, or in the frying operation. In order to obtain a final product having a characteristic banana flavor, it is most advantageous to add some natural or artificial banana flavor to the fried chip. Thus, the final chip is an excellent base for a variety of taste sensations.

The final or second-stage chips are packaged in the same manner as described above for the first-stage chips.

The invention is illustrated, but in no sense limited, by the following typical examples.

EXAMPLE 1

Green, fully mature, unripened bananas (United Fruit Color Chart 1–2) were contacted with boiling water for 10 minutes. As a result, the banana peels puffed and some bursting of the peels occurred. The bananas were then removed from the hot water and were placed in cold water, and were so contacted at 50° F. for about 3 minutes. The bananas were next removed from the cold water and the peels were removed readily from the pulp by hand stripping.

The cooled banana pulp was sliced by cross-cutting with a blade regulated to provide slices from $\frac{1}{16}$–$\frac{1}{32}$ inch. The slices were then contacted in a container with a 1 percent solution of sodium bisulfite for 2 minutes. The slices were transferred to a container of boiling water and were cooked in the boiling water for 20–25 minutes. Physical changes during this cooking operation were observed; the outer portion of the slices became more translucent and radial lines in the slices became more pronounced.

The cooked slices were removed from the boiling water and were placed in cooling water at about 50–60° F. for about 5–10 minutes. This cooling treatment served to firm the slices and thus reduced breakage and loss.

Excess water was drained from the slices. The slices were then placed on aluminum screening and dried in still air at about 70° F. for periods of time ranging from 16 to 48 hours. The partially dried slices had a water content ranging from 5–15 percent by weight.

The slices were then fried in deep fat, comprising mixed vegetable oils (Durkee's Mel-Fry containing small amounts of additives: butylated hydroxy anisole, butylated hydroxy toluene and methyl silicone, the latter serving as an antifoaming agent). Frying was conducted at about 375° F. for 15–25 seconds. The slices puffed immediately on contact with the hot oil and browned slightly. The resulting fried product had a crisp, crunchy texture. The fried product was drained of excess oil. A portion was salted. Another portion was dusted with sugar (sucrose).

EXAMPLE 2

Plantains having a total sugar content of less than 1 percent were treated in a manner similar to that described in Example 1, except for several variations. The plantains were contacted initially with boiling water for about 7 minutes instead of 10 minutes. Some of the plantains were sliced transversely in addition to those sliced at an angle to the vertical grain. Contact with sodium bisulfite was omitted. The intermediate (non-fried) and fried products are similar to those obtained in Example I from bananas.

Although the invention has been described with respect to the process and products detailed above, it is not intended to be limited to the details so recited, since various modifications may be made without departing in any way from the spirit of the present invention.

I claim:
1. The process for producing a banana product which comprises:
   (a) cutting a peeled unripened banana having a total sugar content up to about 1 percent by weight into discrete sections having a thickness of from about 0.02 to about 0.1 inch;
   (b) heating said sections of banana in one part of water or steam to a temperature of from about 150° F. to about 250° F. for a time interval of from about 1 to about 45 minutes under conditions such that the form and shape of said section is retained;
   (c) cooling said heated section to a temperature of from about 35° F. to about 200° F.;
   (d) drying said section to a water content of from about 5 to about 15 percent by weight; and
   (e) subsequently cooking the dried section of (d).

2. The process of claim 1 wherein said section of (c) is washed with water before being dried in (d).

3. The process of claim 1 wherein said section is prepared by:
   (i) heating an unripened mature banana having a total sugar content up to about 1 percent by weight, to loosen the skin from the pulp thereof;
   (ii) cooling the heated banana of (i) at least about 50° F.;
   (iii) separating said skin and said pulp one from the other; and
   (iv) slicing the pulp of (iii) into said discrete sections of (a).

4. The process of claim 1 wherein the dried section of (d) is maintained in a substantially anhydrous atmosphere.

5. The process of claim 1 wherein the dried section of (d) is fried in (e).

6. The process of claim 5 wherein the dried section of (d) is fried in (e) at a temperature of from about 275° F. to about 400° F. for about 5 to about 6 seconds.

7. The process of claim 5 wherein a flavor or seasoning agent is added to the fried section.

References Cited

UNITED STATES PATENTS

| | | | |
|---|---|---|---|
| 1,313,557 | 8/1919 | Pilorz | 99—100 |
| 2,507,564 | 5/1950 | Foote | 99—103 |
| 3,044,880 | 7/1962 | Bogyo | 99—100P |
| 3,139,345 | 6/1964 | Nury | 99—104 |

FOREIGN PATENTS

| | | | |
|---|---|---|---|
| 21,038 | 11/1892 | Great Britain | 99—204 |

OTHER REFERENCES

Everybody's Cookbook—Lord (ed.)—1924—pp. 400–401.

Foods of Old New England—Mosser—1957—p. 201.

Food Technology—Kelley—1955—pp. 388–392.

NORMAN YUDKOFF, Primary Examiner

M. G. MULLEN, Assistant Examiner

U.S. Cl. X.R.

99—100

PO-1050
(5/69)

UNITED STATES PATENT OFFICE
CERTIFICATE OF CORRECTION

Patent No. 3,573,937      Dated April 6, 1971

Inventor(s) EDWARD J. SARNA

It is certified that error appears in the above-identified patent and that said Letters Patent are hereby corrected as shown below:

Column 4, line 5, insert comma (,) after "spice" and "meat", as indicated in specification at page 9, line 10.

Column 5, line 8, Claim 1, after "one" delete "part" as indicated in Amendment dated September 1970, at page 3, line 11.

Column 6, line 7, Claim 6, "6" should read "60", as indicated in Amendment Under Rule 312 dated December 22, 1970 at page 1, Claim 7, line Signed and sealed this 23rd day of November 19

(SEAL)
Attest:

EDWARD M. FLETCHER, JR.      ROBERT GOTTSCHALK
Attesting Officer      Acting Commissioner of Pa